United States Patent Office 3,312,667
Patented Apr. 4, 1967

3,312,667
SYNTHETIC LINEAR COPOLYESTERS AND SHAPED ARTICLES CONTAINING THEM
Lucien Bonnard, Villeurbanne, Rhone, France, assignor to Societe Rhodiaceta, Paris, France, a French body corporate
No Drawing. Filed Dec. 30, 1963, Ser. No. 334,592
Claims priority, application France, Jan. 3, 1963, 920,377
5 Claims. (Cl. 260—75)

This invention relates to new synthetic linear copolyesters, and to yarns, fibres, films, and other shaped articles made from them, which are endowed with a high receptive capacity or affinity for dyes.

Many syntheic linear polyesters can be shaped in the molten state to form yarns, fibres, films, etc. which have good mechanical properties after drawing to a suitable degree.

Among these polyesters those obtained from aromatic dibasic acids, more particularly terephthalic acid, have proved to be particularly interesting. The glycols most generally employed with these aromatic dibasic acids are polymethylene glycols containing 2 to 8 carbon atoms and cis- or trans-saturated cyclo aliphatic diols. These aromatic polyesters have a high melting point, good resistance to hydrolysis and excellent mechanical properties.

Unfortunately, difficulties are encountered in the dyeing of shaped objects, for example fibres, which are prepared from these polyesters, particularly when dyeing with plasto-soluble dyes. The chemical and physical structure of these polymers is such that insufficient dye is taken up by the fibres under standard dyeing conditions. Therefore in order to obtain deep shades, it is necessary to use special dyeing processes. Those which are most currently employed are dyeing under a pressure higher than atmospheric and at a temperature above 100° C., and dyeing in the presence of carriers, which are compounds exerting a certain swelling action on the fibres and favouring the taking up of the dyes.

Attempts have been made to improve the affinity of aromatic polyesters for plastosoluble dyes by various chemical modifications of the polymer, but so far no really satisfactory solution of the problem has been found.

Synthetic linear copolyesters have now been discovered, and it is these which form the subject of the present invention, which can be extruded in the form of shaped elements which can be drawn to give structures, especially yarns, fibres and films, which not only have the valuable mechanical and physical properties of known polyester yarns etc., but also are endowed with a high receptive capacity for dyes and particularly for plastosoluble dyes.

These copolyesters comprise in preponderant proportion in their chain the recurring group:

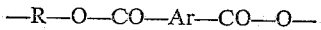

in which R is a saturated cycloaliphatic divalent radical or a linear alkylene radical containing 2 to 8 carbon atoms, preferably —CH$_2$—CH$_2$—, and Ar is a divalent aromatic radical and preferably —C$_6$H$_4$—, especially p—C$_6$H$_4$—, and also comprise in the said chains and in a proportion which is between 0.5 and 5%, the group

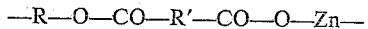
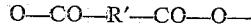

in which R is a radical as defined above, and R' is a linear alkylene radical containing 1 to 10 carbon atoms. (All proportions are by weight.)

If the content of the groups comprising zinc carboxylate radicals is below 0.5%, no substantial difference in dyeing properties between the copolyesters containing them and the known polyesters is observed when dyeing at 100° C. On the other hand, if the content of groups comprising zinc carboxylate radicals is above 5%, certain characteristics of the copolymers, for example colour and viscosity, are so modified that it becomes difficult to obtain shaped products which can be used industrially.

The copolyesters of the invention can for example be prepared by first carrying out in any conventional way an ester interchange reaction between a compound of the formula R$_1$—O—CO—Ar—CO—O—R$_1$ (R$_1$ being a lower alkyl radical, i.e. one containing a maximum of 6 carbon atoms) and a diol of formula HO—R—OH (R having the meaning given above), and then effecting polycondensation of the ester obtained, and incorporating in the reaction mixture, before or after the ester interchange, an ester-zinc salt compound of an aliphatic dicarboxylic acid containing 3–12 carbon atoms, having the formula R$_2$—O—CO—R'—CO—O—Zn—
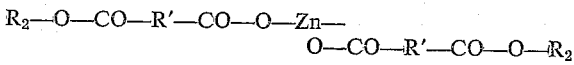

(R$_2$ being a lower alkyl radical and preferably the same as R$_1$), in such a proportion that the content of ester-zinc salt in the reaction mixture after the ester interchange is between 0.5 and 5%.

The ester interchange reaction and the polycondensation reaction can be carried out by the methods ordinarily used for making polyethylene terephthalate, using appropriate known catalysts in each stage. Thus the ester interchange can be carried out by heating the reactants, usually under atmospheric pressure and in the presence of a transesterification catalyst; preferably an excess of the diol is employed, and the heating is continued until the reaction is substantially complete and substantially all the alkanol formed, and the excess diol, has distilled over. The polycondensation may be carried out by heating the ester so formed, usually to a temperature rising to between 250° and 300° C., under low pressure, for example at pressures which at the end may be between 0.25 mm. and 1 mm. of mercury or below. In this step also a suitable catalyst may be used, which may be the same as or different from that employed in the ester interchange. Although the ester interchange method is preferred, other methods known for the production of high linear polyesters can also be used.

It has already been proposed to use zinc salts, and particularly organic zinc salts, which originate from aliphatic monoacids or diacids in the preparation of polyesters. However, these compounds have always been added in a very small amount, the content of zinc in the reaction medium being of the order of one gram atom per ton, with the sole aim of catalysing the ester interchange reaction. However, although these zinc salts have been used industrially as catalysts, particularly in the preparation of polyethylene terephthalate, the fibres obtained from the resulting polymer do not have any special affinity for dyes, including plastosoluble dyes.

If these zinc salts are used in amounts higher than the usual catalytic amounts, they cause, during the polycondensation, parasitic reactions which lead to polymers which cannot be used for the production of satisfactory yarns and fibres. Thus polyesters prepared in the presence of a high proportion, for example 2%, of such zinc salts cannot be spun in practice.

Moreover when the zinc salts are, as is most usually the case, those of acetic acid or another monobasic acid, the zinc atoms obviously cannot enter the polymer chain.

Whereas, compounds which are at the same time esters and zinc salts are soluble in the reaction mixture of glycol terephthalate and ethylene glycol, it is found that zinc salts which are not esters, even though obtained from dibasic acids, do not dissolve, even after prolonged heating. It thus seems that the interchange is not effected between a zinc atom and a hydroxyl group, and a simple zinc salt of a dibasic acid is not changed in the presence of glycol into zinc salt-glycol ester.

The copolyesters of the invention can easily be melt extruded in the form of yarns which can be drawn in the ordinary way; by comparison with known aromatic polyesters, they have distinctly improved dyeing properties, particularly with respect to plastosoluble dyes. Thus individual filaments, yarns, staple fibres and films made from them can be dyed without it being necessary to use carriers or to employ pressures higher than atmospheric pressure.

The following examples illustrate the invention, without limiting it in any way.

Example I

A container with a capacity of 50 litres, heated by a jacket and equipped with a distillation column, is charged with:

| | |
|---|---|
| Dimethyl terephthalate _____ kg__ | 25 |
| Ethylene glycol _____ litres__ | 15 |

"Dowtherm" is caused to circulate in the jacket at a temperature rising from 200° to 250° C.

When the temperature of the reagents reaches 110° C., the following are added while stirring:

| | Kg. |
|---|---|
| Zinc acetate _____ | 0.004 |
| Zinc methyl adipate ($CH_3.O.CO.C_4H_8.CO.O)_2Zn$ __ | 0.546 |
| Antimony oxide _____ | 0.005 |

When the temperature reaches 140° C., methanol begins to distil over. By varying the rate of reflux the temperature at the top of the column is maintained at 64° C.

In 110 minutes, substantially the theoretical quantity of methanol has come over, indicating that the transesterification is complete; the temperature of the reagents reaches 215° C.

The temperature at the top of the column is then allowed to rise to 198° C. and, in 80 minutes, 5200 cc. of a mixture of glycol and traces of methanol are distilled off, the temperature rising meanwhile to 245° C.

The residue, consisting mainly of monomeric glycol terephthalate, is then transferred into an autoclave of 50 litres capacity provided with a heating jacket through which superheated Dowtherm vapour is passed, a stirring device and means for removing glycol vapour.

In the first phase of the reaction, the temperature of the interchange products is brought progressively from 245° to 275° C., while the pressure in the apparatus is lowered, likewise progressively, from 760 mm. Hg to 2.5 mm. Hg by means of an appropriate vacuum pump. In the second phase, the temperature of the products is kept at 275° C. and the pressure is further reduced to 0.7 mm. Hg. The polycondensation is continued at this temperature and under this pressure until the desired viscosity is obtained.

After stopping the stirring and switching off the vacuum pump, the pressure in the autoclave is brought to 3 kg./cm.² and the polymer is discharged in the form of a continuous ribbon, which is cooled and ground.

There is obtained 19.5 kg. of ground polymer in the form of a transparent product of softening point 232° C. and intrinsic viscosity 0.67, determined in a viscosimeter of the Ostwald type on a 1% solution in o-chlorophenol.

From this polymer a 45 denier 22 filament yarn is made by melt spinning and drawing in the ordinary way; the yarn has a tenacity of 4 g./den. and an elongation of 23.8%.

On dyeing this yarn with the dye Bleu Latyl FL in a bath at 100° C. for one hour, without a carrier, an intense blue colour is obtained. (Bleu Latyl FL is a plastosoluble dye marketed by E.I. du Pont de Nemours and Company.)

The fastness of the dyeing to light, washing and heating to 180° C. is satisfactory.

Standard polyethylene terephthalate filaments of comparable mechanical and physical characteristics acquire only a pale blue colour when dyed in the same way.

Example II

Into an apparatus identical with that described in Example I are introduced 25 kg. of dimethyl terephthalate and 15 litres of ethylene glycol.

After heating to 110° C., 0.004 kg. of zinc acetate and 0.005 kg. of antimony oxide are added while stirring.

After removing the methanol and the ethylene glycol by distillation, the residue is transferred to a 50 litre autoclave similar to that of Example I, in which 0.625 kg. of zinc methyl sebacate is added to it.

The polycondensation is then carried out by bringing the temperature of the mixture up to 245° to 275° C., while progressively lowering the pressure to 0.5 mm. Hg. The temperature is kept at 275° C. and the reduction in the pressure is continued to 0.45 mm. Hg; the condensation is continued at this temperature and under this pressure until the desired viscosity is reached.

The polymer is then extruded. It has the following characteristics:

| | |
|---|---|
| Intrinsic viscosity _____ | 0.67 |
| Softening point, ° C. _____ | 220 |

Using this polymer, 45 denier 22 filament yarns are made; hanks of this yarn are dyed with the dye Bleu Resoline FBL in a bath at 100° C. for one hour without a carrier: a fast blue colour is obtained. (Bleu Resoline FBL is a plastosoluble dye marketed by Messrs. Bayer).

Filaments of standard polyethylene terephthalate of comparable mechanical and physical characteristics acquire only a pale blue colour when dyed under the same conditions.

Example III

Yarns of denier 65, 33 filaments and twist 300, are made from a polymer identical with that described in Example I.

These yarns are used in conjunction with 65 denier, 33 filaments yarns with a twist of 300, consisting of standard polyethylene terephthtlate, to produce a taffeta weave fabric of warp count 45 threads per centimetre, with an alternation of 24 polyester threads of the yarn of the invention and 24 standard polyester yarn threads, and weft density 37 threads per centimetre, with an alternation of 24 threads of the yarn of the invention and 24 threads of standard polyester yarn.

The fabric so obtained is preboarded by steam at 130° C., then dyed at 100° C., without a carrier, using the basic dye Bleu Lyrcamine Lumiere B 2 L (a basic dye marketed by Societe Francaise de Matieres Colorantes).

A fabric having blue and white squares is obtained, the standard polyethylene terephthalate yarns not having acquired any colouring.

I claim:

1. Linear copolyesters in which a major proportion by weight of the recurring structural groups have the formula —R.O.OC.Ar.CO.O— in which R is a divalent hydrocarbon radical selected from the class which consists of saturated cycloaliphatic and linear alkylene radicals containing 2–8 carbon atoms, and Ar is a phenylene radical, and in which 0.5 to 5% by weight of the recurring structural groups have the formula —R—O.OC.R′.COO.Zn.O.OC.R′.CO.O—

R being as defined above and R′ being a linear alkylene radical containing 1–10 carbon atoms.

2. Linear copolymers according to claim 1, in which R is the dimethylene radical.

3. Linear copolymers according to claim 1, in which R′ is a tetramethylene radical.

4. Linear copolymers according to claim 1, in which R is the dimethylene radical, Ar is a p-phenylene radical and R′ is a tetramethylene radical.

5. Linear copolymers according to claim 1, in the form of a textile material.

References Cited by the Examiner

UNITED STATES PATENTS 3,032,625   5/1962   Horn _____ 260—75

SAMUEL H. BLECH, *Primary Examiner.*

R. LYON, *Assistant Examiner.*